United States Patent
Jöckel

(10) Patent No.: US 6,938,555 B2
(45) Date of Patent: Sep. 6, 2005

(54) TRACTION DRIVE

(75) Inventor: Andreas Jöckel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/862,624

(22) Filed: Jun. 7, 2004

(65) Prior Publication Data

US 2004/0222761 A1 Nov. 11, 2004

Related U.S. Application Data

(63) Continuation of application No. PCT/DE02/04380, filed on Nov. 28, 2002.

(30) Foreign Application Priority Data

Dec. 11, 2001 (DE) .......................................... 101 60 612

(51) Int. Cl.[7] .............................................. B61C 11/00
(52) U.S. Cl. ......................... 105/34.1; 105/34.2; 105/49
(58) Field of Search ............................... 105/34.1, 34.2, 105/49, 75, 93, 96, 133; 318/700, 701, 705, 254, 376; 187/224; 180/167, 216; 301/37.101, 37.25, 37.105, 37.23, 111.03, 108.1, 31.37, 37.102; 40/587, 591

(56) References Cited

U.S. PATENT DOCUMENTS

| | | | | |
|---|---|---|---|---|
| 3,005,906 A | * | 10/1961 | Butler, Jr. .................. 362/500 |
| 3,499,330 A | * | 3/1970 | Bjorn et al. .................. 73/458 |
| 4,426,606 A | | 1/1984 | Suita et al. | |
| 4,929,030 A | * | 5/1990 | Park ........................ 301/37.25 |
| 6,663,187 B2 | * | 12/2003 | Fitzgerald ................. 301/37.25 |
| 6,690,137 B2 | * | 2/2004 | Iwaji et al. .................. 318/700 |
| 2003/0127289 A1 | * | 7/2003 | Elgas et al. .................. 187/224 |

FOREIGN PATENT DOCUMENTS

| EP | 0 704 961 A | | 4/1996 | |
| EP | 704961 A1 | * | 4/1996 | ............. H02P/3/06 |
| GB | 2054295 A | * | 2/1981 | ............. H02J/3/00 |
| JP | 60187202 A | * | 9/1985 | ........... B60L/11/08 |

* cited by examiner

*Primary Examiner*—Frantz F. Jules
(74) *Attorney, Agent, or Firm*—Henry M. Feiereisen

(57) ABSTRACT

A traction drive, in particular for rail cars, includes a permanent-excited synchronous motor, a traction converter with a pulsed inverter for powering the motor, and ohmic brake resistors. Cross-over switches are connected with a corresponding input terminal of the motor and can switch the input terminal between a corresponding output terminal of the pulsed inverter (for travel) and a terminal of a corresponding brake resistor (for braking). The brake resistors are electrically connected in a star configuration. The traction drive can operate with different supply voltages. There is no longer a need for a mechanical brake, and flat spots on the wheels can be prevented.

19 Claims, 2 Drawing Sheets

TRACTION DRIVE

CROSS-REFERENCES TO RELATED APPLICATIONS

This application is a continuation of prior filed copending PCT International application no. PCT/DE02/04380, filed Nov. 28, 2002, which designated the United States and on which priority is claimed under 35 U.S.C. §120, the disclosure of which is hereby incorporated by reference.

This application claims the priority of German Patent Application, Serial No. 101 60 612.5, filed Dec. 11, 2001, pursuant to 35 U.S.C. 119(a)–(d), the disclosure of which is incorporated herein by reference.

BACKGROUND OF THE INVENTION

The present invention relates to a traction drive with a converter and a permanent-excited synchronous motor, wherein the converter includes a machine-side pulsed inverter.

Conventional traction wheels of rail cars include asynchronous drive motors that are powered by traction drives with pulsed inverters. These traction drives can also be operated as a generator brake in travel and braking mode. A wheel set must have a reliable fail-safe brake so that the motor car can maintain the approved braking distance even if the pulsed inverter malfunctions. Examples of fail-safe brakes are mechanical brakes, for example, disk brakes, shoe brakes and/or electromagnetic rail brakes.

The brake system of an ICE 2/2 train set is described in section 4.3 of the publication "Neue IntercityExpress Triebzüge für die deutsche Bahn" (*New InterCity-Express-Trains for the German Railways*), printed in the German-language publication "eb—Elektrische Bahnen", Vol. 93, 1995, No.1/2, pp. 15 to 24. Such train sets have, in addition to the generator brake of the three-phase asynchronous drive with power line return feed, an air disk brake in both the traction wheels and the track wheels. The brake disks on the track wheels are axle-mounted brake disks, with the brake disks associated with the traction wheels having sintered brake pads. The electronic brake control is combined with the electro-pneumatic control, so that the speed does not have to be restricted if the electronics fails. Preferably, the generator brakes are activated first, and only afterwards are the mechanical brakes activated.

The mechanical brakes disadvantageously represent a complex system prone to malfunction, that can be quite expensive and require frequent maintenance. Moreover, a malfunction in the anti-skid protection can immediately cause flat spots on the wheel sets, which may require reprofiling the wheels at a significant expense.

The European Pat. No. 0 704 961 describes a device for braking a permanent-excited synchronous motor of a lift, wherein the stator windings can be connected with brake resistors via a switch. A frequency converter supplies electric power to the stator winding of the permanent-excited synchronous motor. Due to the small synchronous inductance, each of the add-on brake resistors must have a nonlinear resistance value, whereby the resistance increases with increasing voltage. This nonlinear resistance characteristic ensures a minimum acceptable deceleration rate. The braking power and the current flowing through the brake resistor become large when the stator windings of the permanent-excited synchronous motor supply current through the brake resistors and the motor operates at a very high-speed.

It would therefore be desirable and advantageous to equip a rail car with traction wheels that do not require a mechanical brake and are able to specifically prevent flat spots on wheel rims without the need for a nonlinear resistor.

SUMMARY OF THE INVENTION

According to one aspect of the invention, a traction drive includes a permanent-excited synchronous motor, a traction converter including a pulsed inverter supplying electric power to the motor, a plurality of brake resistors, and a plurality of cross-over switches. Each switch has an input terminal and two output terminals. The input terminal of each switch is connected with a corresponding input terminal of the motor, wherein one of the output terminals is connected with a corresponding output terminal of the pulsed inverter and the other of the output terminals is connected with a terminal of a corresponding brake resistor. The brake resistors are electrically connected in a star configuration.

With the exemplary traction drive according to the invention that has a permanent-excited synchronous motor instead of an asynchronous motor, a mechanical brake can now be used instead of brake resistors. The brake resistors, which are connected in a star configuration, can now be connected with the stator windings of the permanent-excited synchronous machine so that they are decoupled from the output terminals of the traction converter.

A permanent-excited synchronous motor supplies at its terminals a voltage as soon as the motor rotates, thereby obviating the need for an additional gear. This supplied voltage can be used to brake a traction wheel of a rail car. A change-over switch switches this voltage to the brake resistors.

This approach can entirely eliminate mechanical brakes on a traction wheel of a rail car and the costs associated with maintaining a mechanical brake. Since a mechanical brake is the longer required, a traction wheel is not only less costly, but also has a lower mass.

Advantages embodiments of the traction drive may include one or more of the following features. With a synchronous motor, the brake resistors can be ohmic resistors having a current- or voltage-independent resistance value. The cross-over switches can be operated mechanically, electrically or pneumatically. To prevent damage to the motor, the permanent-excited synchronous motor can have a synchronous inductance that is dimensioned so that the short-circuit current of the motor is approximately equal to the motor's rated current. Advantageously, the magnets of the permanent-excited synchronous motor can be arranged in an interior section of the motor.

In particular for AC line voltage operation, the traction converter can include a traction transformer having a primary winding and a secondary winding, a capacitor battery, and a four-quadrant controller having an input connected to the secondary winding of the traction transformer and a DC output connected to a parallel connection of the capacitor battery and DC terminals of the pulsed inverter. Conversely, for DC line voltage operation, the traction converter can include a capacitor battery connected electrically in parallel with DC terminals of the pulsed inverter, and a DC choke having a first terminal connected to an input of the traction converter and a second terminal connected a DC power source. The traction can further include a series-resonant circuit electrically connected in parallel with the capacitor battery as well as an overvoltage protection device electrically connected in parallel with the capacitor battery.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
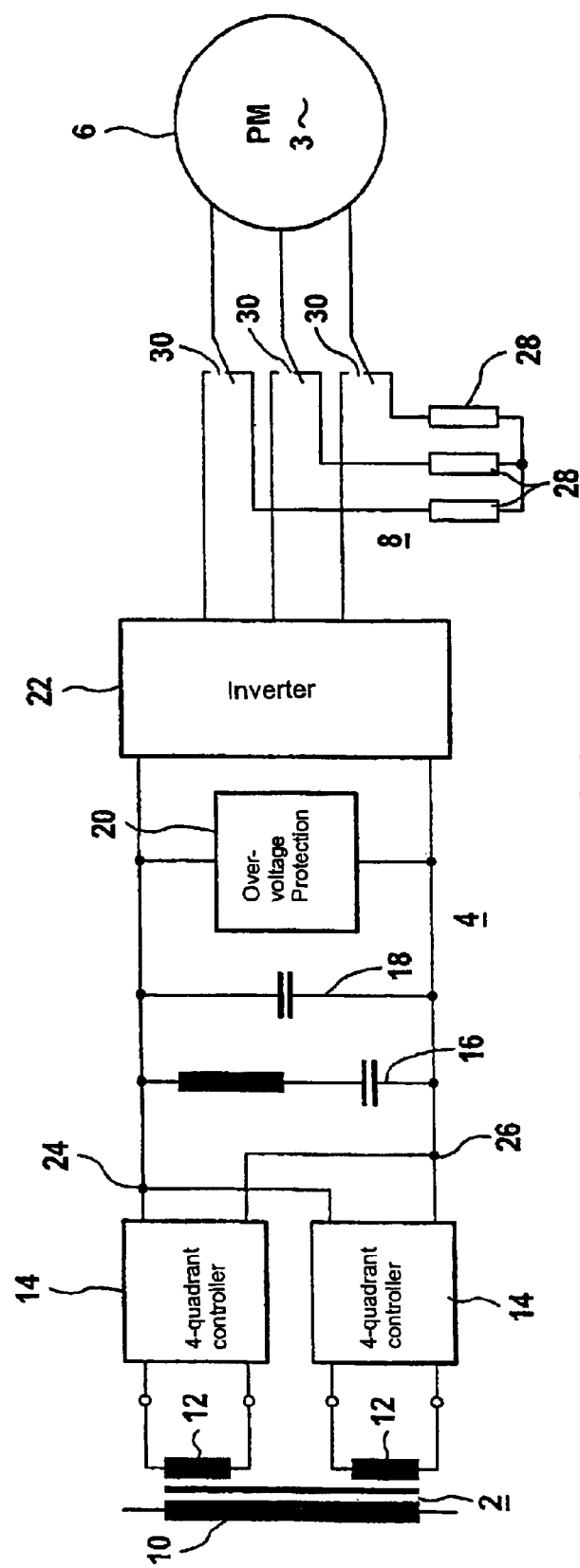
FIG. 1 is a circuit diagram of a traction drive according to the present invention for an AC-vehicle.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in more detail a circuit diagram of a traction drive for a vehicle powered by alternating current, also referred to as AC-vehicle. The traction drive includes a traction transformer 2, a traction converter 4, a permanent-excited synchronous motor 6, and a brake system 8. The exemplary traction transformer 2 has a primary winding 10 and one or more secondary windings 12, with two secondary windings 12 shown in the example depicted in FIG. 1. The exemplary traction converter 4 of FIG. 1 has two four-quadrant controllers 14, a series-resonant circuit 16, a capacitor battery 18, an overvoltage protection device 20 and a pulsed inverter 22 with an AC output for powering the three-phase synchronous motor 6. The AC input terminals of the two four-quadrant controllers 14 are each connected with a corresponding secondary winding 12 of the traction transformer 2, whereas the DC output terminals of the two four-quadrant controllers 14 are electrically connected in parallel. The series-resonant circuit 16, the capacitor battery 18, the overvoltage protection device 20 and the DC-side input terminals of the pulsed inverter 22 are connected in parallel with the DC-side terminals 24 and 26 of the DC output terminals of the two four-quadrant controllers 14. The AC output terminals of the pulsed inverter 22 can be connected with corresponding terminals of the permanent-excited synchronous motor 6. Such traction drives are known in the art.

The brake system 8 includes a brake resistor 28 and a cross-over switch 30 for each phase of the permanent-excited synchronous motor 6. The brake resistors 28 are electrically connected in a star configuration and have each a constant resistance value. The cross-over switches 30 are connected with corresponding AC output terminals of the pulsed inverter 22 and with the input terminals of the permanent-excited synchronous motor 6. The cross-over switches 30, depending on the switch position, allow the input terminals of the permanent-excited synchronous motor 6 to be connected, on one hand, with the corresponding brake resistor 28 and, on the other hand, with the corresponding AC output terminals of the pulsed inverter 2.

The cross-over switches 28, which are also referred to as fail-safe switches, can be operated electrically or mechanically or pneumatically. The permanent-excited synchronous motor 6 generates a braking torque that decreases with decreasing speed of the rail car as soon as these cross-over switches 28 are switched from the operating position "Drive", where the terminals of the permanent-excited synchronous motor are connected with the AC output terminals of the pulsed inverter 22, to the operating position "Braking", where the terminals of the permanent-excited synchronous motor 6 are connected with the brake resistors 28 that are connected in star configuration. Neither the pulsed inverter 22 nor any other control elements are required for generating the braking torque.

This approach results in a fail-safe electric brake for traction wheels of a rail cars that operates independent of the inverter 22.

The fail-safe brake has also a built-in anti-skid protection. In other words, braking can no longer cause flat spots of the wheel set of a traction wheel, since the generated braking torque decreases automatically when the wheel set begins to skid on a wet rail. A braking torque can only be generated when the rotor of the permanent-excited synchronous motor rotates. Without a rotation of the rotor, no voltage is generated at the terminals of the permanent-excited synchronous motor. The brake resistors 28 cannot generate a braking torque without an induced voltage. When the wheels of a rail car skid, the wheels are almost at rest. In this situation, the permanent-excited synchronous motor 6 and the brake resistors 28 cannot generate a braking torque for the skidding wheels, so that the wheel keep rotating, albeit slowly, and flat spots are no longer produced.

Figure 2:
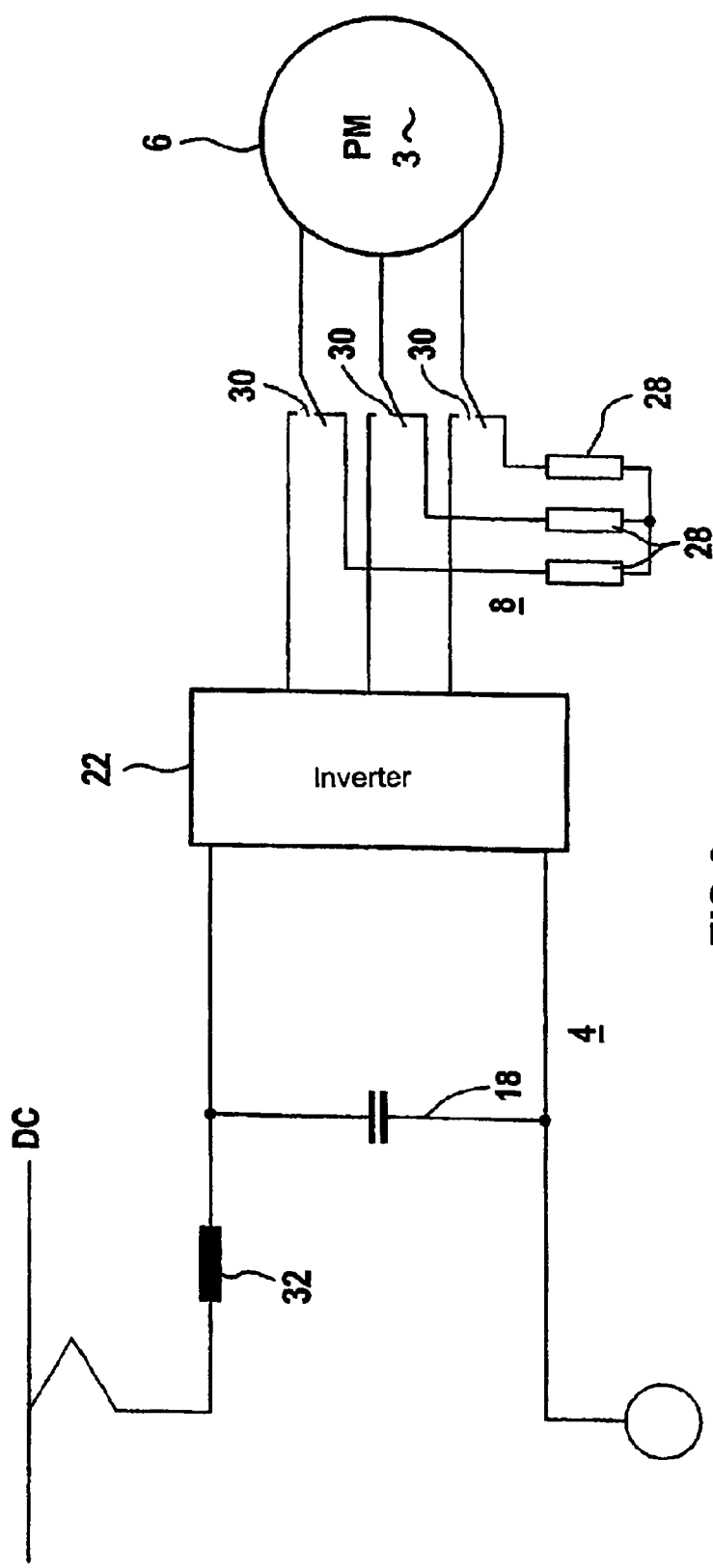
FIG. 2 is a circuit diagram of a traction drive according to the present invention for a DC-vehicle.

With the embodiment of the traction drive according to the invention, a mechanical brake can be entirely eliminated on a drive wheel set of a rail car. FIG. 2 shows in more detail a circuit diagram of an exemplary traction drive for a rail car powered by direct current, also referred to as DC-vehicle. This traction drive of FIG. 2, unlike the traction drive of FIG. 1, has a traction converter 4 without the afore-described four-quadrant controllers 14, the traction transformer 2 or the series-resonant circuit 16. The capacitor battery 18 is here electrically connected via a DC choke 32 with a pantograph of the DC-vehicle. If the DC-vehicle is to be operated of several different DC voltage systems, the traction converter 4 can include an additional DC/DC converter (not shown), for example, a step-up/step-down switching regulator.

As seen from the two exemplary embodiments described above with reference to FIGS. 1 and 2, a traction drive according to the invention can be constructed that can operate with different types of power supply circuit. However, the motor must be a permanent-excited synchronous motor which is powered by a pulsed inverter 22. Accordingly, the traction drive according to the invention can also be used with diesel-electric vehicles.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A traction drive, comprising:
   a permanent-excited synchronous motor,
   a traction converter including at least one pulsed inverter supplying electric power to the motor,
   a plurality of brake resistors which are electrically connected in a star configuration, and
   a plurality of pneumatically operated cross-over switches, each switch having an input terminal and two output terminals, with the input terminal connected to a corresponding input terminal of the motor and one of the output terminals connected with a corresponding output terminal of the pulsed inverter and the other of the output terminals connected with a terminal of a corresponding one of the brake resistors.

2. The traction drive of claim 1, wherein the brake resistors are ohmic resistors with a constant resistance value.

3. The traction drive of claim 1, wherein the permanent-excited synchronous motor operates at a rated current and has a synchronous inductance dimensioned so that a short-circuit current is approximately equal to the rated current.

4. The traction drive of claim 3, wherein the permanent-excited synchronous motor includes magnets arranged in an interior section of the motor.

5. A traction drive comprising:
   a permanent-excited synchronous motor,
   a traction converter including at least one pulsed inverter supplying electric power to the motor,
   a plurality of brake resistors electrically connected in a star configuration, and
   a plurality of cross-over switches, each switch having an input terminal and two output terminals, with the input terminal connected to a corresponding input terminal of the motor and one of the output terminals connected with a corresponding output terminal of the pulsed inverter and the other of the output terminals connected with a terminal of a corresponding one of the brake resistors,
   the traction converter further including a traction transformer having a primary winding and a secondary winding, a capacitor battery, and a four-quadrant controller having an input connected to the secondary winding of the traction transformer and a DC output connected to a parallel connection of the capacitor battery and DC terminals of the pulsed inverter.

6. The traction drive of claim 5, wherein each of the cross-over switches is constructed so as to be electrically operatable.

7. The traction drive of claim 5, wherein each of the cross-over switches is constructed so as to be mechanically operatable.

8. The traction drive of claim 5, further comprising a series-resonant circuit electrically connected in parallel with the capacitor battery.

9. The traction drive of claim 5, further comprising an overvoltage protection device electrically connected in parallel with the capacitor battery.

10. The traction drive of claim 5, wherein the brake resistors are ohmic resistors with a constant resistance value.

11. The traction drive of claim 5, wherein the permanent-excited synchronous motor operates at a rated current arid has a synchronous inductance dimensioned so that a short-circuit current is approximately equal to the rated current.

12. The traction drive of claim 5, wherein the permanent-excited synchronous motor includes magnets arranged in an interior section of the motor.

13. A traction drive comprising:
   a permanent-excited synchronous motor,
   a traction converter including at least one pulsed inverter supplying electric power to the motor,
   a plurality of brake resistors electrically connected in a star configuration, and
   a plurality of cross-over switches, each switch having an input terminal and two output terminals, with the input terminal connected to a corresponding input terminal of the motor and one of the output terminals connected with a corresponding output terminal of the pulsed inverter and the other of the output terminals connected with a terminal of a corresponding one of the brake resistors,
   the traction converter further including a traction a capacitor battery connected electrically in parallel with DC terminals of the pulsed inverter, and a DC choke having a first terminal connected to an input of the traction converter and a second terminal connected a DC power source.

14. The traction drive of claim 13, wherein each of the cross-over switches is constructed so as to be electrically operatable.

15. The traction drive of claim 13, wherein each of the cross-over switches is constructed so as to be mechanically operatabled.

16. The traction drive of claim 13, wherein each of the cross-over switches is constructed so as to be pneumatically operatable.

17. The traction drive of claim 13, wherein the brake resistors are ohmic resistors with a constant resistance value.

18. The traction drive of claim 13, wherein the permanent-excited synchronous motor operates at a rated current and has a synchronous Inductance dimensioned so that a short-circuit current is approximately equal to the rated current.

19. The traction drive of claim 13, wherein the permanent-excited synchronous motor includes magnets arranged in an interior section of the motor.

* * * * *